(12) United States Patent
Yang et al.

(10) Patent No.: US 11,511,436 B2
(45) Date of Patent: Nov. 29, 2022

(54) ROBOT CONTROL METHOD AND COMPANION ROBOT

(71) Applicant: HUAWEI TECHNOLOGIES CO., LTD., Guangdong (CN)

(72) Inventors: Sixiao Yang, Shenzhen (CN); Heng Liao, Shenzhen (CN); Maosheng Huang, Shenzhen (CN); Jiansheng Wei, Shenzhen (CN); Dawei Huo, Shenzhen (CN); Wenhua Sun, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 960 days.

(21) Appl. No.: 16/276,576

(22) Filed: Feb. 14, 2019

(65) Prior Publication Data

US 2019/0184573 A1 Jun. 20, 2019

Related U.S. Application Data

(63) Continuation of application No. PCT/CN2017/097517, filed on Aug. 15, 2017.

(30) Foreign Application Priority Data

Aug. 17, 2016 (CN) .......................... 201610681117.X
May 4, 2017 (CN) .......................... 201710306154.7

(51) Int. Cl.
*G06F 3/01* (2006.01)
*B25J 11/00* (2006.01)
(Continued)

(52) U.S. Cl.
CPC .......... *B25J 11/001* (2013.01); *B25J 11/0005* (2013.01); *G06F 3/01* (2013.01);
(Continued)

(58) Field of Classification Search
CPC ........ B25J 11/001; B25J 11/0005; G06F 3/01; G06N 3/006; G06N 3/008; G06N 20/00; G06V 40/20
See application file for complete search history.

(56) References Cited

U.S. PATENT DOCUMENTS 8,996,429 B1 * 3/2015 Francis, Jr. ........... G06F 16/214
706/45
9,216,508 B2 12/2015 Ruuspakka et al.
(Continued)

FOREIGN PATENT DOCUMENTS

CN 101795830 A 8/2010
CN 101927492 A 12/2010
(Continued)

OTHER PUBLICATIONS

David M. Biei et al. Latent Dirichlet Allocation, Journal of Machine Learning Research vol. 3, 2003, pp. 993-1022, XP05560039.
(Continued)

*Primary Examiner* — Pei Yong Weng
(74) *Attorney, Agent, or Firm* — Womble Bond Dickinson (US) LLP

(57) ABSTRACT

The present invention provides a robot control method, and the method includes: collecting interaction information of a companion target, and obtaining digital person information of a companion person (101), where the interaction information includes interaction information of a sound or an action of the companion target toward the robot, and the digital person information includes a set of digitized information of the companion person; and determining, by using the interaction information and the digital person information, a manner of interacting with the companion target (103); generating, based on the digital person information of the companion person and by using a machine learning algorithm, an interaction content corresponding to the inter-
(Continued)

action manner (105); and generating a response action toward the companion target based on the interaction manner and the interaction content (107).

20 Claims, 3 Drawing Sheets

(51) Int. Cl.
  *G06N 3/00* (2006.01)
  *G06V 40/20* (2022.01)
  *G06N 20/00* (2019.01)
(52) U.S. Cl.
  CPC ............. *G06N 3/006* (2013.01); *G06N 3/008* (2013.01); *G06V 40/20* (2022.01); *G06N 20/00* (2019.01)

(56) References Cited

U.S. PATENT DOCUMENTS

| | | | |
|---|---|---|---|
| 2002/0016128 A1* | 2/2002 | Saito | A63H 3/28 446/268 |
| 2011/0118870 A1 | 5/2011 | Sugihara et al. | |
| 2013/0158707 A1 | 6/2013 | Lee et al. | |
| 2016/0199977 A1 | 7/2016 | Breazeal | |

FOREIGN PATENT DOCUMENTS

| | | |
|---|---|---|
| CN | 102591470 A | 7/2012 |
| CN | 103280126 A | 9/2013 |
| CN | 102077260 B | 4/2014 |
| CN | 104290097 A | 1/2015 |
| CN | 204695082 U | 10/2015 |
| CN | 105068661 A | 11/2015 |
| CN | 105082150 A | 11/2015 |
| CN | 105138710 A | 12/2015 |
| CN | 105389461 A | 3/2016 |
| CN | 105511260 A | 4/2016 |
| CN | 105632254 A | 6/2016 |
| CN | 105760362 A | 7/2016 |
| CN | 105832073 A | 8/2016 |
| CN | 105844978 A | 8/2016 |
| CN | 105844980 A | 8/2016 |
| CN | 107784354 A | 3/2018 |
| JP | 2015066622 A | 4/2015 |
| WO | 2009157733 A1 | 12/2009 |

OTHER PUBLICATIONS

Hae Won Park et al. Retrieving Experience: Interactive Instance-based Learning Methods for Building Robot Companions, 2015 IEEE International Conference on Robotics and Automation (ICRA), Seattle, Washington, May 26-30, 2015, pp. 6140-6145. XP033169275.
Jun Tani et al. Self-organization of distributedly represented multiple behavior schemata in a mirror system: reviews of robot experiments using RNNPB,Neural Networks, vol. 17 Issue 8-9, Oct. 2004, pp. 1273-1289. XP004650398.
Phoebe Liu et al. How to train your robot-Teaching service robots to reproduce human social behavior, The 23rd IEEE International Symposium on Robot and Human Interactive Communication, 2014. pp. 961-968. XP032664805.
Xu Xiaoyun et al. The Design and Research of Nursing Mode and Function of Humanized Household Nursing Robot, Hebei University of Technology, Mar. 2015. total 88 pages. With English abstract.

* cited by examiner

ROBOT CONTROL METHOD AND COMPANION ROBOT

CROSS-REFERENCE TO RELATED APPLICATIONS

This application is a continuation of International Application No. PCT/CN2017/097517, filed on Aug. 15, 2017, which claims priority to Chinese Patent Application No. 201710306154.7, filed on May 4, 2017 and claims priority to Chinese Patent Application No. 201610681117.X, filed on Aug. 17, 2016, all of which are hereby incorporated by reference in their entireties.

TECHNICAL FIELD

The present invention relates to the artificial intelligence field, and more specifically, to a robot control method and a robot, particularly, a companion robot in the artificial intelligence field.

BACKGROUND

With continuous development of artificial intelligence, educated artificial intelligence (Educated AI) includes an intelligent system having features such as application limitation, user education, a self-learning and reasoning ability, and a judgment ability, and can help people better complete specific tasks or task sets more efficiently.

In families of a modern society, more parents cannot always accompany a child, and when the parents cannot accompany the child, the parents can use an intelligent robot to accompany the child. An existing intelligent robot can communicate with the child, and learn and update a manner of communicating with the child based on communication with the child.

However, the existing intelligent robot cannot meet a higher accompanying requirement of future parents for accompanying the child by the intelligent robot.

SUMMARY

Embodiments of the present invention provide a robot control method, a robot, and a control information generation method and apparatus, to control the robot to accompany a companion target with reference to features of a companion person.

According to a first aspect, an embodiment of the present invention provides a robot control method, and a robot completes imitation of a companion person through information collection and data processing to accompany a companion target. According to the first aspect of the embodiments of the present invention, the control method includes: collecting, by the robot, interaction information of the companion target, and obtaining digital person information of the companion person, where the interaction information is information sent by the companion target when the companion target interacts with the robot, and may include interaction information of a sound or an action of the companion target toward the robot, and the digital person information includes a set of digitized information of the companion person; determining, by using the interaction information and the digital person information, a manner of interacting with the companion target; selecting, based on the digital person information of the companion person and by using a machine learning algorithm, one or more contents from scores of a plurality of interaction contents as an interaction content; and generating a response action toward the companion target based on the interaction manner and the interaction content.

The robot control method provided in the present invention is used, and when the companion person cannot be at the companion target's side, the robot can be controlled to imitate the companion person to accompany the companion target, so that a requirement that the companion person personally accompanies the companion target can be met. The companion target is an object accompanied by the robot, and may be a child, or may be an old person. The companion person is a real companion of the companion target, for example, parents or a guardian of a child, or an accompanying person of an old person.

In an embodiment of the first aspect, the robot may generate the scores of the plurality of interaction contents corresponding to the interaction manner, and determine the interaction content based on the scores. In an embodiment of the first aspect, latest behavior information of the companion person in a time period prior to a current moment is obtained, and the behavior information of the companion person may be collected by a mobile device carried by the companion person, or may be directly collected by the robot. The robot generates, based on the digital person information and the latest behavior information of the companion person and by using the machine learning algorithm, the plurality of interaction contents corresponding to the interaction manner, and may further generate, based on the digital person information and the latest behavior information of the companion person and by using the machine learning algorithm, the scores of the plurality of interaction contents corresponding to the interaction manner, and then determine the interaction content and the interaction manner based on the scores.

In an embodiment of the first aspect, the robot may further obtain latest behavior information of the companion person in a time period prior to a current moment, where the behavior information of the companion person may be collected by a mobile device carried by the companion person, or may be directly collected by the robot. The robot determines, by using the interaction information, the digital person information, and the latest behavior information, the manner of interacting with the companion target.

In an embodiment of the first aspect, the robot may further obtain latest behavior information of the companion person in a time period prior to a current moment, where the behavior information of the companion person is collected by a mobile device carried by the companion person; and obtain digital person update information of the companion person by analyzing the latest behavior information, where the digital person update information is used to improve or update the digital person information, and the digital person information is determined by analyzing the behavior information of the companion person or in a manual input manner.

In an embodiment of the first aspect, before the obtaining digital person information of the companion person, the method further includes: adding the digital person update information with an additional weight to the digital person information, to improve or update the digital person information by using the update information.

In an embodiment of the first aspect, a value of the additional weight may be adjusted, to increase or decrease impact caused by the behavior information of the companion person in the time period prior to the current moment on the digital person information.

Further, the robot may further add the digital person update information to the digital person information by using the machine learning algorithm.

In an embodiment of the first aspect, the digital person information includes one or more of the following types of information: personal basic information, personal experience information, values information, educational idea information, and behavior habit information. The robot may calculate semantic similarity between the digital person information, the interaction information, and the interaction manner, and select an interaction manner with maximum semantic similarity as the manner of interacting with the companion target.

In an embodiment of the first aspect, the generating, based on the digital person information of the companion person, the scores of the plurality of interaction contents corresponding to the interaction manner includes: generating, by using a model generated by training, the scores of the plurality of interaction contents corresponding to the interaction manner, where the model uses the digital person information as an input, and uses the scores of the plurality of interaction contents corresponding to the interaction manner as an output.

In an embodiment of the first aspect, the companion person includes a plurality of companion persons, the digital person information of the companion person is a weighted summation of feature information of the plurality of companion persons, and a weight of the feature information of the companion person may be preset or may be obtained through manual inputting.

In an embodiment of the first aspect, the companion person includes a plurality of companion persons, and the digital person information of the companion person is obtained by using machine learning of feature information of the plurality of companion persons.

In an embodiment of the first aspect, the method is executed by the robot accompanying the companion target, and the digital person information of the companion person is collected by the mobile device carried by the companion person.

According to a second aspect, an embodiment of the present invention provides a robot device, and the robot device may be used as a companion robot. The device includes: an information obtaining module, an interaction manner generation module, an interaction content generation module, and a response module. The information obtaining module is configured to: collect interaction information of a companion target, and obtain digital person information of a companion person. The interaction information includes interaction information of a sound or an action of the companion target, and the digital person information includes a set of digitized information of the companion person. The interaction manner generation module is configured to: determine, based on the interaction information and the digital person information, a manner of interacting with the companion target, and generate, based on the digital person information of the companion person and by using a machine learning algorithm, an interaction content corresponding to the interaction manner. The response module is configured to generate a response action toward the companion target based on the interaction manner and the interaction content.

In a possible embodiment of the second aspect, the interaction manner generation module may be further configured to generate scores of a plurality of interaction contents corresponding to the interaction manner, and determine the interaction content based on the scores.

In a possible embodiment of the second aspect, the information obtaining module is further configured to obtain latest behavior information of the companion person in a time period prior to a current moment, where the behavior information of the companion person is collected by a mobile device carried by the companion person. The interaction manner generation module is further configured to: generate, based on the digital person information and the latest behavior information of the companion person and by using a machine learning algorithm, a plurality of interaction contents corresponding to the interaction manner, or generate scores of a plurality of interaction contents corresponding to the interaction manner and then determine the interaction content and the interaction manner based on the scores.

In a possible embodiment of the second aspect, the information obtaining module is further configured to obtain latest behavior information of the companion person in a time period prior to a current moment, where the behavior information of the companion person is collected by a mobile device carried by the companion person. The interaction manner generation module is configured to determine, by using the interaction information, the digital person information, and the latest behavior information, the manner of interacting with the companion target.

In a possible embodiment of the second aspect, the information obtaining module is further configured to obtain latest behavior information of the companion person in a time period prior to a current moment, where the behavior information of the companion person is collected by a mobile device carried by the companion person. A digital person update module is configured to obtain digital person update information of the companion person by analyzing the latest behavior information, to improve or update the digital person information, where the digital person information is determined by analyzing the behavior information of the companion person or in a manual input manner.

In one embodiment, the information obtaining module may be disposed in a robot body and obtain information, for example, by using a sensor or a signal collection module. The information obtaining module may further be a remote device of the robot, or may be an independent terminal device, for example, a smartphone or an intelligent wearable device that can communicate with the robot.

In a possible embodiment of the second aspect, before the information obtaining module is configured to obtain the digital person information of the companion person, the digital person update module is configured to add the digital person update information with an additional weight to the digital person information, to improve or update the digital person information by using the update information.

In a possible embodiment of the second aspect, a value of the additional weight may be adjusted, to increase or decrease impact caused by the behavior information of the companion person in the time period prior to the current moment on the digital person information.

In a possible embodiment of the second aspect, the information obtaining module is further configured to add the digital person update information to the digital person information by using the machine learning algorithm.

In a possible embodiment of the second aspect, the digital person information includes one or more of the following types of information: personal basic information, personal experience information, values information, educational idea information, and behavior habit information. The interaction manner generation module is configured to: calculate semantic similarity between the digital person information, the interaction information, and the interaction manner, and select an interaction manner with maximum semantic similarity as the manner of interacting with the companion target.

In a possible embodiment of the second aspect, the interaction content generation module is configured to generate, by using a model generated by training, scores of the plurality of interaction contents corresponding to the interaction manner, where the model uses the digital person information as an input, and uses the scores of the plurality of interaction contents corresponding to the interaction manner as an output.

In a possible embodiment of the second aspect, the companion person includes a plurality of companion persons, the digital person information of the companion person is a weighted summation of feature information of the plurality of companion persons, and a weight of the feature information of the companion person may be preset or may be obtained through manual inputting.

In a possible embodiment of the second aspect, the companion person includes a plurality of companion persons, and the digital person information of the companion person is obtained by using machine learning of feature information of the plurality of companion persons.

In a possible embodiment of the second aspect, an execution body of the device is executed by the robot accompanying the companion target, and the digital person information of the companion person is collected by the mobile device carried by the companion person.

The embodiments of the present invention provide a robot, and when the companion person cannot be at the companion target's side, the robot can be controlled to imitate the companion person to accompany the companion target, so that a requirement that the companion person personally accompanies the companion target can be met.

BRIEF DESCRIPTION OF DRAWINGS

To describe the technical solutions in the embodiments of the present invention more clearly, the following briefly describes the accompanying drawings required for describing the embodiments of the present invention.

DESCRIPTION OF EMBODIMENTS

The following describes the technical solutions in the embodiments of the present invention with reference to the accompanying drawings in the embodiments of the present invention.

Figure 1:
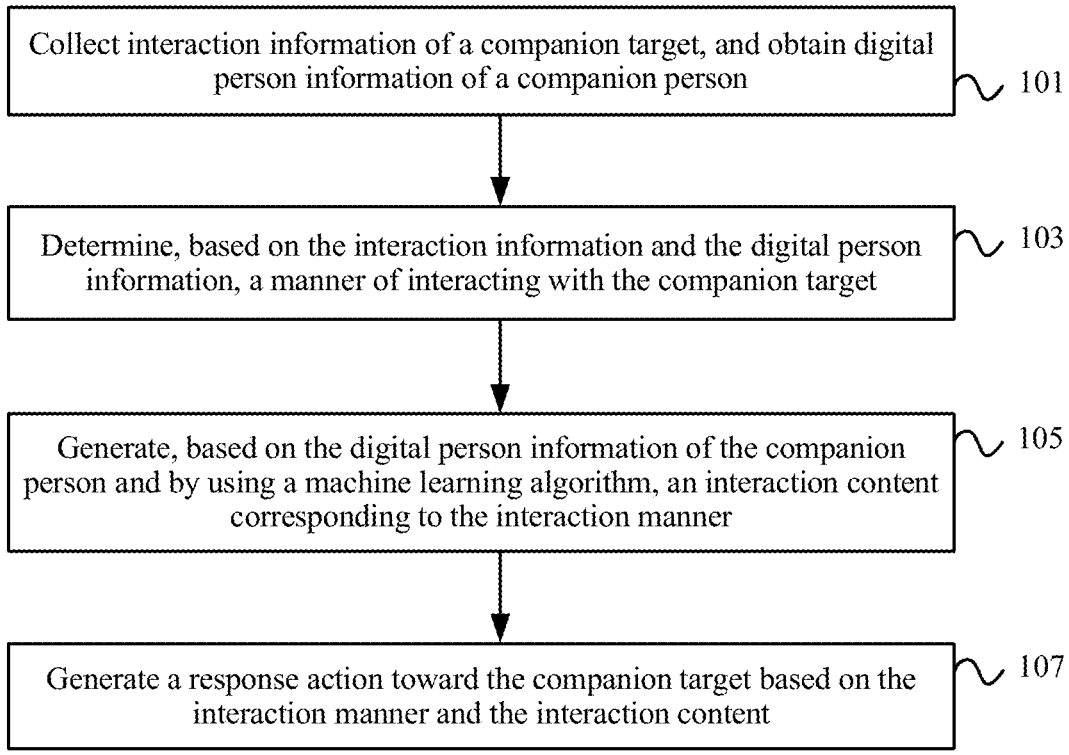
FIG. 1 is a schematic flowchart of a robot control method according to an embodiment of the present invention.

The embodiments of the present invention provide a robot control method. As shown in FIG. 1, FIG. 1 provides a flowchart of an embodiment of the present invention. The method includes the following operations.

Operation S101. Collect interaction information of a companion target, and obtain digital person information of a companion person. The interaction information includes interaction information of a sound or an action of the companion target toward a robot, and the digital person information includes a set of digitized information of the companion person.

The robot may obtain, using a collection device such as a sensor or a microphone, a behavior signal that is sent by the companion target, and obtain the interaction information of the companion target by using the captured behavior signal, so that the robot can know what the companion target is doing or what the companion target wants to do. The digital person information of the companion person is a digitized companion person, and is data information that enables the robot to imitate the companion person.

Operation S103. Determine, based on the interaction information and the digital person information, a manner of interacting with the companion target.

Operation S105. Generate, based on the digital person information of the companion person and by using a machine learning algorithm, an interaction content corresponding to the interaction manner.

Alternatively, operation S105 may be performed as follows: Generate, based on the digital person information of the companion person and by using the machine learning algorithm, scores of a plurality of interaction contents corresponding to the interaction manner, and select, from the scores of the plurality of interaction contents, one or more contents that get a highest score as an interaction content. Determining the content by using the score is a specific implementation.

Operation S107. Generate a response action toward the companion target based on the interaction manner and the interaction content.

The robot control method provided in this embodiment of the present invention is used, and when the companion person cannot be at the companion target's side, the robot can be controlled to imitate the companion person to accompany the companion target, so that a requirement that the companion person personally accompanies the companion target can be met.

In one embodiment, the interaction information may be generated when the robot responds to an interaction request, or actively generated, or preset. As a specific implementation, the interaction information may be actively generated by the robot by analyzing a behavior of the companion target, and includes video capture information of the companion person, or voice input information of the companion person, or the like. For example, if the robot analyzes a behavior action that is of the companion target and that is obtained through video shooting and determines that the companion target wants to play football, the robot may actively generate interaction information of playing football with the companion target, and take an action of playing football with the companion target. The interaction information may be applied in embodiments as a part of information that is relatively independently obtained. Alternatively, the robot may directly interact with the companion target by observing a behavior of the companion target.

In one embodiment, the interaction information may further be a received interaction request of the companion target. For example, if the robot receives an interaction request that the companion target would like to listen to music, the robot may respond to the interaction request of the companion target, and listen to music with the companion target.

In one embodiment, the interaction information may further be a received interaction request of the companion person. For example, if the robot may request, by using an interaction request sent by the companion person by using a remote intelligent device, the robot to accompany a child to sleep, the robot may respond to the interaction request of the companion person to accompany the companion target to sleep.

In one embodiment, the interaction information may further be interaction information that is set when the companion person pre-installs a program. For example, the interaction information of feeding fruit to the child at 10 o'clock every morning may be set by the companion person in the pre-installed program of the robot.

The digital person information of the companion person includes one or more of the following types of information: personal basic information, personal experience information, values information, educational idea information, and behavior habit information. The personal basic information may include information about a personal attribute of the companion person such as a name, a gender, an age, a favorite color, and a favorite book of the companion person, and the personal experience information of the companion person may include a life experience, a learning experience, and a work experience of the companion person. The values information of the companion person may include religion and a values idea of the companion person, and the like. The behavior habit information may include a daily behavior manner, a personal habit, and an interest of the companion person, and the like. This is not limited in the present invention.

The interaction information may have various sources, for example, may be an interaction request sent by the companion person by using a remote web-connected device, or may be actively generated by the robot by analyzing behavior data of the companion target. An embodiment of obtaining the interaction information is as follows: The robot receives an interaction request of the companion person or the companion target, and the robot analyzes the interaction request and determines the interaction information.

The behavior information of the companion person may be collected by a mobile device carried by the companion person. For example, collection of the behavior information is implemented in one or more of the following manners: collecting a voice input of the companion person by using a microphone, collecting a video input of the companion person by using a camera, and inputting by using a keyboard or a touchscreen of the mobile device. A length of a previous time period may be set. For example, the time period may be set to two hours, 12 hours, or 24 hours. Optionally, the behavior information of the companion person includes voice data, action data, or application software operation data of the companion person. For example, the behavior information of the companion person may be voice data of a voice conversation performed by the companion person, a behavior action that is of the companion person and that is obtained through video shooting, or operation data of an operation performed by the companion person on software in the intelligent device. This is not limited in this embodiment of the present invention.

In one embodiment, the robot may obtain the digital person information of the companion person from a memory of the robot. The digital person information in the memory may be pre-stored by the data collection device. The robot can still accompany the companion target by using the local digital person information of the companion person without network access. This is not limited in this embodiment of the present invention.

In one embodiment, the robot may receive digital person information that is of a companion person and that is sent by a data collection device; may obtain behavior information of a companion person by using a data collection device, analyze the behavior information of the companion person, and obtain digital person information of the companion person; or may obtain behavior information of a companion person by using a cloud server, where the digital person information is determined by the cloud server by analyzing the behavior information of the companion person. The digital person information may be directly input by the companion person, or may be digital person information that is pre-stored by the data collection device and that is obtained from a memory of the robot. This is not limited in this embodiment of the present invention.

In one embodiment, communication features of the companion person include various types of information, and the various types of information include at least two types of the following information: basic information, speech information, and behavior habit information of the companion person. This is not limited in this embodiment of the present invention.

As an embodiment, the intelligent device carried by the companion person may actively obtain instant communication information of the companion person. For example, a parent says "doing exercise is very important, and our child does exercise after reading a book for an hour" to a friend in an instant communication application.

As another embodiment, the intelligent device carried by the companion person may actively obtain information of processing a companion article by the companion person by using a first device, specifically including: forwarding or originally creating article information of a social network, and reading annotation information of an article and comment information of the social network article. For example, a parent reads a new article about a children education method, "three to five years old is a critical period of children language development" is mentioned in the article, and the parent forwards the article to WeChat Moments, and posts a comment "a good viewpoint". Alternatively, a parent reads an article about a children education method in an electronic device of the parent, and makes an annotation (words or symbols) in the article.

It should be understood that the digital person information of the companion person is determined by analyzing the behavior information of the companion person. The digital person information includes various types of information, and the various types of information include at least two types of the following information: personal basic information, personal experience information, speech information, and behavior habit information of the companion person.

In one embodiment, the personal basic information of the companion person may include information about a personal attribute of the companion person such as a name, a gender, an age, a favorite color, a favorite book of the companion person. This is not limited in the present invention.

In one embodiment, the personal experience information of the companion person may include a life experience, a learning experience, and a work experience of the companion person. For example, mother was born in France, father studied in the United States, and mother works in Company A. This is not limited in the present invention. The speech information of the companion person may include religion and a career idea of the companion person, an opinion that is of an educationist and that is approved by the companion person, and an educational idea to which the companion person pays attention. For example, mother believes in Christianity; father is a director of a non-profit organization and often gives to charity; the opinion of the educationist is as follows: A critical period theory of language learning exists, and a story retelling ability is vitally important in childhood; an educational idea of mother is as follows: Reciting words is very important, and it is excellent to recite many words in childhood, and an educational idea of father is as follows: It is excellent to know some knowledge of astronomy and geography in childhood. This is not limited in the present invention. The behavior habit information of the companion person may include a daily behavior manner, a personal habit, and an interest of the companion person. For example, mother likes to tell a story when accompanying a child to sleep, and father likes playing football and likes to shoot with the left foot. This is not limited in this embodiment of the present invention.

Data obtained by the data collection device in the last time period may be stored in a storage device, so that the robot can read the data.

As an optional embodiment, if the robot captures, by using a video, a scene in which the companion target goes to a study room and takes a storybook, the robot generates interaction information of telling a story, and determines an interaction manner of telling a story to the companion target, and when telling a story to the companion target, the robot combines a content in the digital person information of the companion person, for example, adds a tone in which the companion person speaks and a personal experience of the companion person.

As another embodiment, if the robot learns, based on the digital person information of the companion person, that the companion person is accustomed to sleeping at nine o'clock every night, the robot generates interaction information of sleeping at nine o'clock in the evening, and determines an interaction manner of accompanying a companion object to sleep, and when accompanying the companion object to sleep, the robot combines educational idea information of the companion person. It is assumed that the companion person considers that a child should listen to more fairy tales, and the robot tells a fairy tale when accompanying the companion object to sleep. This is not limited in this embodiment of the present invention.

A more specific instance is described by using an example. A companion study database is stored in the robot, and includes various types of data such as a story, a children's song, an action, and Wikipedia. The story includes five stories: "a little turtle visiting grandpa", "a little monkey picking corns", "a kitten planting fish", "Kong Rong giving up pears", and "a small gecko borrowing a tail". Other types of data are not listed.

In an actual application scenario, a companion object of the robot is a child Mingming, and a companion person is a parent Zhang San of Mingming.

1. The robot obtains digital person information of Zhang San, the companion person Zhang San is a parent, and the digital person information of the companion person is as follows:

Age: 30 years old
Gender: female
Education: bachelor
Major: finance
Work experience: an entrepreneur, once worked as an employee in a finance company, attaching importance to technology and science
Interests: reading, watching a movie, and going shopping
Favorite color: red
Worldview: positive and optimistic
Educational idea: science, singing children's songs, and telling a story Zhang San forwards and taps the like icon below an article "studies show that science education is very beneficial to brain development of four-year-old children", and posts a comment "I think science education is very important, and it is time for my child to know causes of some natural phenomena", and then shares an article "let children sing happily" and makes an annotation "accompanying children to sing children's songs is a very important communication manner; although I do not sing very well, I would like to sing along with my child". In this way, a part of information about the educational idea in the digital person information is generated. A weight may be manually set. For example, a weight of telling a story and a weight of science may be set to 1.0, and because the companion person is not good at singing children's songs, a weight of signing children's songs may be set to 0.5.

A companion target is a four-year-old child Mingming who can express a thought by speaking and understand meanings of some basic actions.

2. Mingming says "talk with me", a data collection device of the robot obtains this interaction request, and the robot identifies, by using processes such as speech recognition and natural language processing, interaction information of "talk with me" of Mingming.

3. The robot obtains interaction information, including obtaining two sentences "mom is going to work, and I will tell you a story when I come back" and "Mingming is a good boy" that are said to Mingming, recognizing, by the robot, the two sentences "mom is going to work, and I will tell you a story when I come back" and "Mingming is a good boy" as texts by using a speech recognition algorithm, and then identifying the interaction information of "tell a story" by using a natural language processing method.

In one embodiment, the interaction information may be actively generated by the robot by analyzing the behavior information of the companion person, may be received interaction information that is actively sent by the companion person, may be a received interaction request of an accompanied person, may be actively generated by the robot by analyzing a behavior of the companion target, or may be interaction information that is set when a program is pre-installed. This is not limited in this embodiment of the present invention.

As an embodiment, when the robot tells a story to the companion target, the robot searches a story database by using one or more pieces of information in a digital person information knowledge base of a first companion person as a keyword, and tells the child a found story that matches the keyword.

As another embodiment, when the robot accompanies the companion target, the robot performs retrieval in a companion study database by using a keyword of a first companion person. For example, if it is found that a hobby of the first companion person in behavior habit information of the first companion person is jogging, when the robot accompanies the companion target, the robot may collect a robot behavior model related to jogging, and the robot is guided to accompany the companion target according to the model.

In one embodiment, family relationship index information, values information, and educational idea information of the companion person are used to generate digital person information of the companion person. The digital person information is an information set G including values, an educational idea, a family relationship index of the companion person, and G includes various types of information of the companion person, such as {origin, university, religion, age, interest, and the like}. Contents of an information base include but are not limited to the foregoing examples. As collected information increases, a dimension may be expanded to two orders of magnitude or even three orders of magnitude.

A network side or a robot side maintains a larger story database or a companion study database that matches the digital person information. For example, when the robot tells a story to a companion object, the robot searches the story database by using one or more pieces of information of the digital person information of the companion person as a keyword, and tells the child a story that matches the keyword. Alternatively, when accompanying the companion object, the robot performs retrieval in the companion study database by using a keyword of the companion person. For example, a hobby of the companion person in interest information is jogging. When the robot accompanies the companion object, the robot may collect a robot behavior model related to jogging, and the robot is guided to accompany the companion object according to the model.

In one embodiment, the robot may further pre-store digital person information of the companion person, or the robot may obtain pre-stored digital person information of the companion person from a cloud server. The digital person information includes but is not limited to one or more types of the following information: a hometown of the companion person, a life experience of the companion person, a career of the companion person, interests of the companion person, values of the companion person, and religion information of the companion person. The robot may further combine the pre-stored digital person information of the companion person to interact with the companion target. This is not limited in this embodiment of the present invention.

In one embodiment, a cloud server or a robot side maintains a larger story database or a companion study database that matches a digital person information knowledge base.

Figure 2:
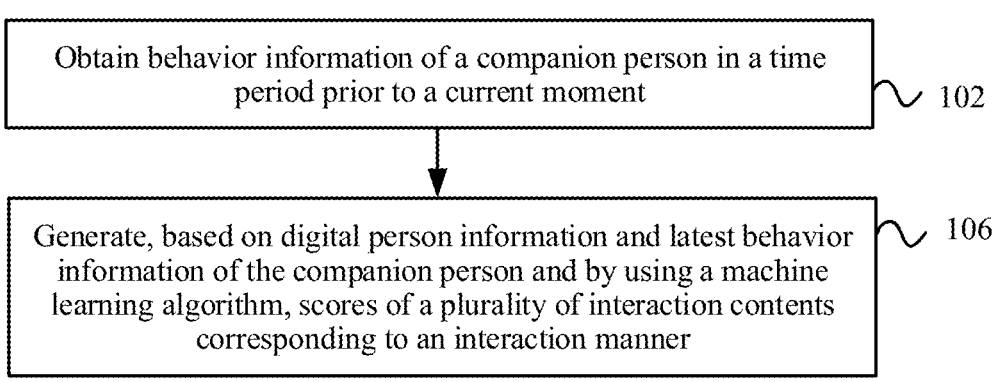
FIG. 2 is another schematic flowchart of a robot control method according to an embodiment of the present invention.

In an embodiment of the method, FIG. 2 provides another flowchart of a method embodiment of the present invention. The method further includes the following operations:

Operation S102. Obtain behavior information of the companion person in a time period prior to a current moment.

The behavior information herein may be latest behavior information of the companion person, and frequency of obtaining a latest behavior of the companion person can be adjusted by setting a time span of the time period prior to the current moment. The behavior information of the companion person may be collected by a mobile device carried by the companion person. Even if the companion person is not at the robot's side or the companion target's side in this time period, the behavior information can still be obtained by the robot, and the robot can better imitate the companion object or the robot can better understand a manner or thought of accompanying the companion object by the companion person. An order of performing operations S102 and S101 is not limited, and operation S102 may be performed before or after operation S101.

Operation S106 may be performed as follows: Generate, based on digital person information and the latest behavior information of the companion person and by using the machine learning algorithm, scores of a plurality of interaction contents corresponding to the interaction manner. An interaction manner and an interaction content may be determined based on the scores, for example, by selecting a highest score or a higher score.

In another embodiment of the method, the determining, by using the interaction information and the digital person information, a manner of interacting with the companion target in operation S103 may be performed as follows: determining, by using the interaction information, the digital person information, and the latest behavior information, the manner of interacting with the companion target.

Figure 3:
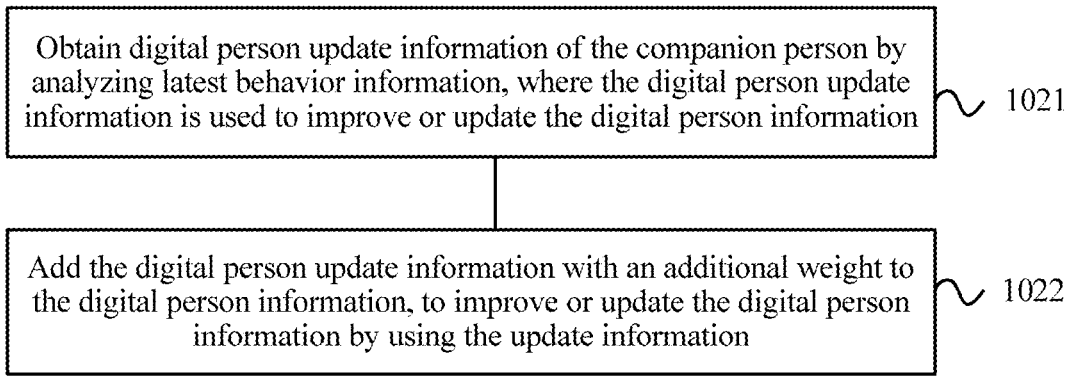
FIG. 3 is still another schematic flowchart of a robot control method according to an embodiment of the present invention.

In an embodiment of the method, the operations of modifying the digital person information obtained or stored by the robot are shown in FIG. 3. After obtaining the latest behavior information of the companion person in the time period prior to the current moment, a process of modifying or updating the digital person information includes the following operations.

Operation S1021. Obtain digital person update information of the companion person by analyzing the latest behavior information, where the digital person update information is used to improve or update the digital person information.

The digital person information may be determined by analyzing the behavior information of the companion person or in a manual input manner. The obtaining digital person update information of the companion person by analyzing the latest behavior information specifically includes: converting the behavior data into text information in various manners, for example, for a voice input, voice behavior data is converted into a text by using speech recognition and text processing; converting the foregoing text information into latest behavior information by using various natural language processing technologies, where the natural language processing technologies include but are not limited to one or more of technologies such as keyword identification, subject extraction, and focus detection; and setting a weight for each piece of latest behavior information in a specific manner, for example, the companion person presets the weight.

Operation S1022. Add the digital person update information with an additional weight to the digital person information, to improve or update the digital person information by using the update information.

In one embodiment, the adding the digital person update information with an additional weight to the digital person information includes the following operations:

S1. The robot obtains the digital person update information of the companion person by analyzing the latest behavior data.

S2. Update the digital person information of the companion person based on the update digital person information in a specific manner. For example, if a weight w is set for the digital person information of the current moment, an updating manner is as follows:

$$f \leftarrow f + w \times f_0, \text{ where}$$

f is a value of a feature of digital person information that needs to be updated, w is a weight, and $f_0$ is a value of a feature of latest digital person information of the companion person.

In an embodiment of the method, a value of the additional weight w may be adjusted, to increase or decrease impact caused by the behavior information of the companion person in the time period prior to the current moment on the digital person information. In a specific implementation, the digital person information f is more stable and includes more pieces of information about the companion person, and the digital person update information f0 represents a variation amount of the latest digital person information and includes fewer pieces of information about the companion person. If it is expected to increase impact caused by the behavior information of the companion person in a previous time period on a manner of accompanying the child and decrease impact caused by the more pieces of information about the companion person in f, the weight value w may be increased.

In one embodiment, a weight of each type of information in various types of information may be a weight that is set when the companion person pre-installs a program, a weight that is sent to the robot by using an interaction request of the companion person, or a weight that is determined by the robot by learning based on some settings of the companion person. This is not limited in this embodiment of the present invention.

In an embodiment of the method, the digital person update information is added to the digital person information by using the machine learning algorithm. Specifically, operations of adding the digital person update information to the digital person information by using the machine learning algorithm are performed as follows:

S1. Read digital person information and latest behavior information of the companion person at a previous moment.

S2. Obtain digital person information of the companion person at a current moment.

S3. Compare the digital person information at the current moment with the digital person information at the previous moment, and obtain a changed feature dimension of all information and a variation amount.

S4. Repeat S1 to S3 on data of a plurality of companion persons in a plurality of time periods, and obtain changed feature dimensions of digital person information of the plurality of companion persons in the plurality of time periods and corresponding variation amounts.

S5. Use behavior information of the companion person in a time period as an input, use a changed feature dimension and a corresponding variation amount as an output, use LASSO regression as a model, and obtain a model M after training, where M uses the behavior information as an input, and uses the changed feature dimension and the variation amount as an output.

S6. For the digital person information and the latest behavior information, use the model M, and obtain a changed feature dimension of the digital person information and a corresponding variation amount.

S7. Modify the digital person information based on the changed feature dimension and the corresponding variation amount.

In an embodiment of the method, the digital person information includes one or more of the following types of information: personal basic information, personal experience information, values information, educational idea information, and behavior habit information. The determining, by using the interaction information and the digital person information, a manner of interacting with the companion target in S103 includes: calculating semantic similarity between the digital person information, the interaction information, and the interaction manner, and selecting an interaction manner with maximum semantic similarity as the manner of interacting with the companion target.

Specifically, operation S103 may have various implementations, and a typical embodiment is as follows:

1. For a plurality of interaction manners corresponding to the interaction information and the digital person information, semantic similarity between the digital person information, the interaction information, and the interaction manner is calculated, and the semantic similarity may be implemented by using a technology such as word vector. This is not limited in the present invention.

2. Similarity between the interaction information and the interaction manner is determined based on the semantic similarity between the interaction information, the digital person information, and the interaction manner, and a weight of the interaction manner. A calculation formula is as follows: $sim = s \times w$ (1), where s is semantic similarity of interaction information and an interaction manner, w is a weight of the interaction manner, and sim is similarity between the interaction information and the interaction manner.

3. An interaction manner with maximum similarity sim is selected as the manner of interacting with the companion target.

In an embodiment of the method, the generating, based on the digital person information of the companion person, scores of a plurality of interaction contents corresponding to the interaction manner in S105 includes: generating, by using a model generated by training, the scores of the plurality of interaction contents corresponding to the interaction manner, where the model uses the digital person information as an input, and uses the scores of the plurality of interaction contents corresponding to the interaction manner as an output.

Specifically, training data for generating the model may come from public data or data obtained by another data collection device.

A specific embodiment is as follows:

1. The robot calculates semantic similarity between an interaction manner and interaction information, and interaction information by using a word vector method, and a format "the interaction manner, the interaction information, and the semantic similarity" is as follows:

Tell a story, talk with me, 0.7; and sing children's songs, talk with me, 0.8.

According to a formula (1), similarity between "tell a story" and "talk with me" is 0.7*1=0.7, and similarity between "sing children's songs" and "talk with me" is 0.8*0.5=0.4.

The robot selects "tell a story" with highest similarity as a manner of interacting with the companion target.

2. The model for generating the interaction content may use various algorithms, for example, logistic regression, KNN, and a support vector machine. The KNN is used as an example. A principle of the KNN algorithm is calculating K samples that are nearest to a test sample and reading corresponding labels, and using the percentage of a quantity of samples corresponding to a label to a total quantity of samples as a score that is of the test sample and that is corresponding to the label. In this example, the testing sample is digital person information of Zhang San, the label is interaction content, and K=100. After digital person information of 100 digital persons that are nearest to the digital person information of Zhang San are obtained, it is found, through statistics collection, that for selection of five stories, 15 digital persons select "a little turtle visiting grandpa", 20 digital persons select "a little monkey picking corns", 25 digital persons select "a kitten planting fish", 12 digital persons select "Kong Rong giving up pears", and 28 digital persons select "a small gecko borrowing a tail". Scores got by Zhang San on the five stories are as follows:

A little turtle visiting grandpa 0.15

A little monkey picking corns 0.20

A kitten planting fish 0.25

Kong Rong giving up pears 0.12

A small gecko borrowing a tail 0.28

3. Five stories are analyzed by using a topic analysis algorithm LDA (Latent Dirichlet allocation), obtained topics and weights of the five stories are as follows:

A little turtle visiting grandpa: love (0.4), respecting the old (0.6)

A little monkey picking corns: perseverance (0.5), single-mindedness (0.5)

A kitten planting fish: science (0.7), plants (0.3)

Kong Rong giving up pears: politeness (0.3), courtliness (0.3), and modesty (0.4)

A small gecko borrowing a tail: science (0.8), animals (0.2)

Only "science" exists in interaction content intention information of the companion person, and a weight of "science" is 1.0.

Semantic similarity between "science" and the foregoing topics is calculated by using the word vector method, and a format "interaction content intention information, a topic, and semantic similarity" is as follows:

Science, love, 0.0
Science, respecting the old, 0.2
Science, perseverance, 0.3
Science, single-mindedness, 0.3
Science, science, 1.0
Science, plants, 0.4
Science, politeness, 0.1
Science, courtliness, 0.1
Science, modesty, 0.4
Science, animals, 0.6

A current behavior intention weight is set, and a=0.5. Then modified scores that are of the five stories and that are calculated by using a formula (2) are as follows:

A little turtle visiting grandpa:

$s$(a little turtle visiting grandpa)=0.15+0.5×(1.0×0.0× 0.4+1.0×0.2×0.6)=0.21

A little monkey picking corns:

$s$(a little monkey picking corns)=0.2+0.5×(1.0×0.3× 0.5+1.0×0.3×0.5)=0.35

A kitten planting fish:

$s$(a kitten planting fish)=0.25+0.5×(1.0×1.0×0.7+1.0× 0.4×0.3)=0.66

Kong Rong giving up pears:

$s$(Kong Rong giving up pears)=0.12+0.5×(1.0×0.1× 0.3+1.0×0.1×0.3+1.0×0.4×0.4)=0.23

A small gecko borrowing a tail:

$s$(a small gecko borrowing a tail)=0.28+0.5×(1.0× 0.8×1.0+1.0×0.2×0.6)=0.74

4. Because a score of "a small gecko borrowing a tail" is highest, the robot selects "a small gecko borrowing a tail" as an interaction content of interacting with the companion target.

5. The robot synthesizes speech of "a small gecko borrowing a tail" as a response action by using a speech synthesis algorithm based on the interaction manner of "tell a story" and the interaction content "a small gecko borrowing a tail", and plays the response action by using a loudspeaker to implement a behavior feedback for "talk with me" of Mingming. An intention of Zhang San that is "I think science education is very important, and it is time for my child to know causes of some natural phenomena" is better implemented.

Further, in an embodiment of the present invention, the generating, based on the digital person information and the latest behavior information of the companion person and by using a machine learning algorithm, scores of a plurality of interaction contents corresponding to the interaction manner includes: modifying the scores of the plurality of interaction contents by using the latest behavior information, and selecting one or more contents with a highest score from the modified scores of the interaction contents as an interaction content.

The foregoing operation may have various implementations, and a typical implementation is as follows:

1. The interaction content is analyzed by using a topic extraction technology, and a plurality of topics of the plurality of interaction contents and a score of each topic are obtained.

2. For a plurality of pieces of feature information in the digital person information, semantic similarity between the plurality of pieces of feature information in digital person information and the plurality of topics of the plurality of interaction contents is calculated, and the semantic similarity may be calculated by using the word vector manner.

3. The scores of the plurality of interaction contents are modified according to the following formula, and modified scores of the plurality of interaction contents are obtained:

$$s_{new} = s + a \times \sum_{i=1}^{m} \sum_{j=1}^{n} w(p_i) \times s(t_j) \times sim(p_i, t_j), \qquad (2)$$

where s is a score of an interaction content, $p_i$ is $i^{th}$ digital person information feature information, $w(p_i)$ indicates a weight of $p_i$, $t_j$ is a $j^{th}$ topic of the interaction content, $s(t_j)$ is a score of $t_j$, $sim(p_i, t_j)$ indicates semantic similarity between the digital person feature information and the topic, $s_{new}$ indicates a modified score of the interaction content, and a is a weight of a current behavior intention. A value of a may be specified by the companion person in advance or may be randomly generated by the robot. A large value of a may be set when it is required that the current behavior intention should have relatively great impact on the interaction content; otherwise, a small value of a may be set when it is required that the current behavior intention should have relatively light impact on the interaction content.

After the digital person information of the companion person is collected, the digital person information may be sorted based on appearance frequency and an appearance scenario of various pieces of information about the companion person, and a weight a is allocated to each piece of information according to importance. The personal information set of the companion person further includes a weight corresponding to information in the personal information set. During an accompanying process, if companion searching is performed on a companion object by using a keyword, one or more pieces of information with a maximum weight may be selected based on the weight for performing searching. Alternatively, different information in the information set may be selected based on the scenario. For example, when the robot accompanies the companion object to play games, values and an interest in the information set are selected as keywords without considering other information such as origin and age.

In an embodiment of the method, the companion person includes a plurality of companion persons, the digital person information of the companion person is a weighted summation of feature information of the plurality of companion persons, and a weight of the feature information of the companion person may be preset or may be obtained through manual inputting.

Convergence of information of the plurality of companion persons has various implementations. A typical implementation is as follows: A corresponding weight is set for information of each companion person, and an initial value of the weight may be manually input by the plurality of companion persons or may be set by the robot. For example, the robot may set the weight of the information of each companion person to 1/N, where N is a quantity of digital persons, or may separately set different weights based on importance of the companion persons (for example, the plurality of companion persons include parents and grandparents; if it is expected to increase parent impact on the child in companion impact, a weight corresponding to a parent companion person may be increased, and a weight corresponding to a grandparent companion person may be decreased).

Weighted digital person information is calculated according to weights of a plurality of pieces of digital person information, and a formula is as follows:

$$f_k = \sum_{i=1}^{N} w_i f_{k,i},$$

where $f_k$ is a value of $k^{th}$ weighted digital person information, $w_i$ is a weight of $i^{th}$ digital person information, and $f_{k,i}$ is a value of $k^{th}$ information of an $i^{th}$ digital person.

If the companion person includes the plurality of companion persons, information sets of the plurality of companion persons may be combined to generate an information set of a plurality of objects. The information set of the plurality of objects may include information and a weight corresponding to the information. The information weight is related to an information weight of each object before combination, and also related to importance of the plurality of objects.

As another embodiment, if mother has a better language talent in a family, and it is expected that the child is greatly influenced by mother's language, a weight of a language feature in digital person information of mother is set to be higher than a weight of digital person information of another digital person in a robot program, or the weight of the language feature of mother even may be set to 1. The robot can perform weighting on various types of information of mother, to obtain weighted digital person information of mother, determine, based on interaction information and the weighted digital person information of mother, a manner of interacting with a child or an interaction content, generate a response action, and perform behavior feedback to the child by using the response action to respond to the interaction information. This is not limited in this embodiment of the present invention.

It should be understood that, a weight of each piece of digital person information in a plurality of pieces of digital person information is changed, so that an extent of impact caused by each piece of digital person information on the companion target can be changed in a process in which the robot accompanies the companion target.

In one embodiment, the weight of each piece of digital person information in various pieces of digital person information may be a weight that is set when the companion person pre-installs a program, a weight that is sent to the robot by using an interaction request of the companion person, or a weight that is determined by the robot by learning based on some settings of the companion person. This is not limited in this embodiment of the present invention.

For example, if father realizes that he has a bad temper and inputs this information to the robot, the robot weakens this type of behavior when accompanying the child. An optimal companion action can be selected based on a companion scenario by using this implementation method.

As another embodiment, if it is expected that a child is greatly influenced by father in educating a boy, a weight of digital person information of mother is set to be lower than a weight of digital person information of father in a robot program, or the weight of the digital person information of father even may be set to 1, and the weight of the digital person information of mother is set to 0. The robot can perform weighting on the digital person information of mother and the digital person information of father, to obtain digital person information of a companion person, determine, based on interaction information and the digital person information of the companion person, at least one of an interaction manner and an interaction content of interacting with the child, generate a response action, and perform behavior feedback to the child by using the response action to respond to the interaction information. This is not limited in this embodiment of the present invention.

In an embodiment of the method, the companion person includes a plurality of companion persons, and the digital person information of the companion person is obtained by using machine learning of feature information of the plurality of companion persons.

In one embodiment, operations of combining the digital person information of the plurality of companion persons by using the machine learning algorithm are performed as follows:

S1. Read digital person information of a plurality of companion persons.

S2. Calculate similarity between any two companion persons based on a cosine similarity calculation formula.

S3. Use digital person information of a companion person as a vertex, and if similarity between digital person information of two companion persons is greater than a threshold, establish an edge, and obtain a digital person information image G of the companion person.

S4. Use a PageRank algorithm for the image G, and obtain a PageRank value of each vertex.

S5. Obtain the digital person information of the companion person in the following manner:

$$f \leftarrow \sum_{i=1}^{N} w_i \times f_i,$$

where f is a piece of information of the digital person information of the companion person, $w_i$ is a PageRank value of an $i^{th}$ companion person, $f_i$ is a value of this piece of information of the $i^{th}$ companion person, and N is a quantity of companion persons.

Figure 4:
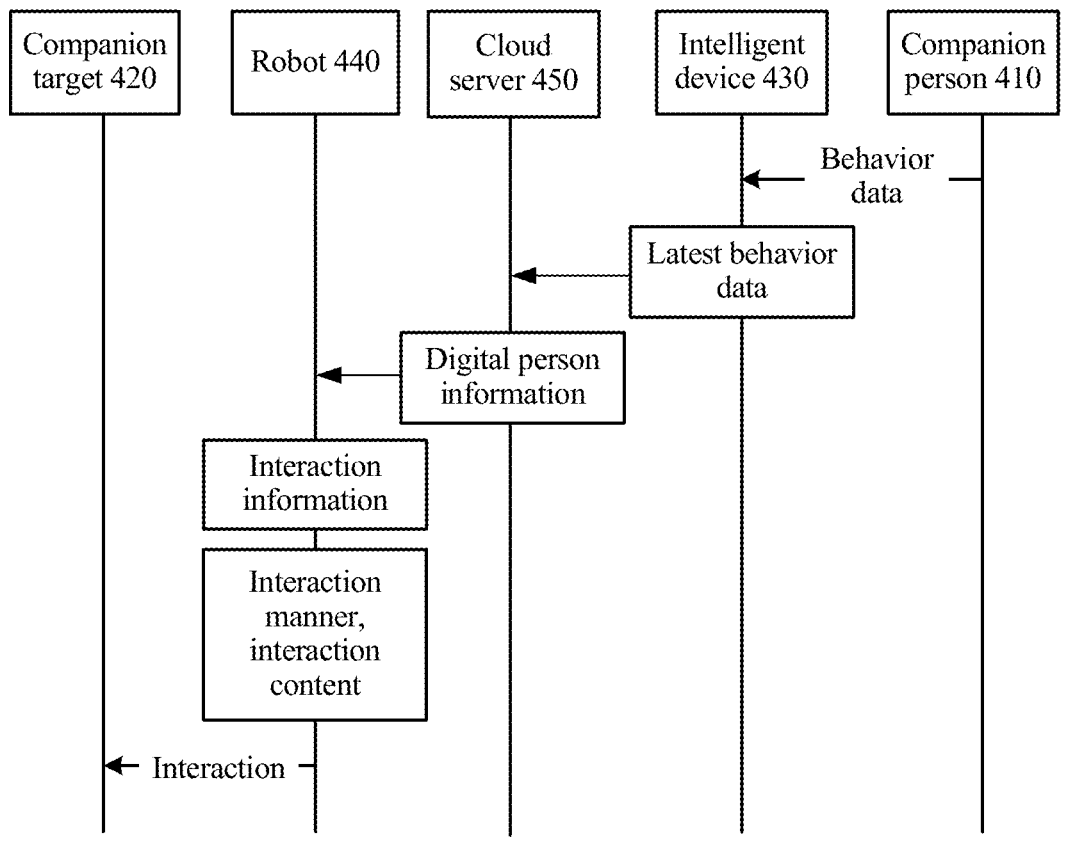
FIG. 4 is a diagram of a relationship between components of a system according to an embodiment of the present invention.

In an embodiment of the method, the method is executed by a robot accompanying the companion target, and digital person information of the companion person is obtained by collecting by using an intelligent device carried by the companion person. As shown in FIG. 4, FIG. 4 provides a diagram of a relationship between components of the method in the present invention, including a relationship between a companion person 410 and a companion object 420 that is involved in an execution process. Interaction between the companion person 410 and the companion object 420 is implemented by using an intelligent device 430 and a robot 440. The intelligent device 430 collects behavior data of the companion person, and obtains latest behavior data. The intelligent device 430 sends the latest behavior data to a cloud server 450, and the cloud server calculates and analyzes the behavior data, obtains digital person information of the companion person, and sends the digital person information to the robot 440. The robot determines an interaction manner and an interaction content of interacting with the companion target based on interaction information that is of the companion target and that is obtained by collecting by the robot and the digital person information of the companion person, to implement interaction with the companion target. In practice, whether to use the cloud server may be selected according to a computing capability of the robot. In a possible implementation, the cloud server may be omitted, and the robot directly obtains the digital person information by calculating and analyzing the behavior data. The robot may further directly obtain the behavior data of the companion person by using a sensor device carried in a robot body.

Figure 5:
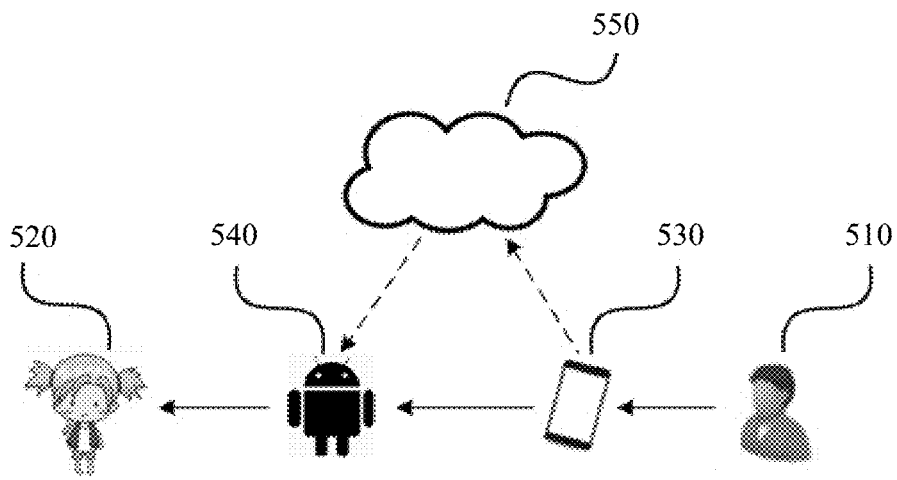
FIG. 5 is a schematic architectural diagram of a robot control system according to an embodiment of the present invention.

FIG. 5 shows a schematic architectural diagram of a robot control system according to an embodiment of the present invention. As shown in FIG. 5, the control system includes at least one companion person (a companion person 510 shown in FIG. 5), a companion target 520, an intelligent device 530, a robot 540, and a cloud server 550.

The companion person 510 is a person who expects to frequently accompany the companion target 520, and can educate and influence a to-be-accompanied target. The companion person may be, for example, a guardian or a teacher of the companion target.

The intelligent device 530 is configured to obtain behavior information of the companion person 510, determine latest behavior information of the companion person by analyzing the behavior information of the companion person, and send digital person information generated based on the latest behavior information to the robot 540, to control interaction between the robot and the companion target by using the digital person information.

In one embodiment, the intelligent device 530 may extract the digital person information of the companion person from the behavior information of the companion person in a manner such as semantic analysis, a machine learning algorithm, or keyword matching. This is not limited in this embodiment of the present invention.

Optionally, the intelligent device 530 may be a remote device of the robot 540, may be a dedicated device that specially cooperates with the robot, or may be an intelligent device in which a program cooperating with the robot is installed, for example, may be a mobile terminal, an intelligent wearable device, or a robot accompanying the companion person.

In one embodiment, the intelligent device 530 may be a data collection device. The data collection device may directly receive behavior information that is input by the companion person in manners such as voice inputting, video inputting, or keyboard and touchscreen inputting, or the intelligent device 530 may obtain behavior information of the companion person by using a data collection device that can communicate with the intelligent device. This is not limited in this embodiment of the present invention.

The robot 540 is configured to: obtain interaction information by using the obtained digital person information of the companion person, determine, based on the interaction information and the digital person information of the companion person, at least one of an interaction manner and an interaction content of interacting with the companion target, generate a response action, and perform behavior feedback for the companion target by using the response action to respond to the interaction information.

The cloud server 550 is configured to forward or analyze information transmitted between the intelligent device 530 and the robot 540.

In one embodiment, the robot may receive digital person information that is of a companion person and that is sent by a data collection device; may obtain behavior information of a companion person by using a data collection device, analyze the behavior information of the companion person, and obtain digital person information of the companion person; or may obtain behavior information of a companion person by using a cloud server, where the digital person information is determined by the cloud server by analyzing the behavior information of the companion person. The digital person information may be directly input by the companion person, or may be digital person information that is pre-stored by the data collection device and that is obtained from a memory of the robot. This is not limited in this embodiment of the present invention.

The data collection device or the cloud server analyzes the behavior information of the companion person to obtain the digital person information of the companion person, so that a computing amount and an information processing speed of the robot can be reduced, and performance of the robot can be improved.

In one embodiment, the data collection device may be a mobile intelligent device carried by the companion person. The intelligent device may be a remote device of the robot, may be a dedicated device that specially cooperates with the robot, or may be an intelligent device in which a program cooperating with the robot is installed, for example, may be a mobile phone, an intelligent wearable device, or a robot that can accompany the companion person. This is not limited in this embodiment of the present invention.

In one embodiment, the data collection device may obtain behavior information of the companion person by using a sensor, for example, may receive behavior information that is input by the companion person in manners such as voice inputting, video inputting, or keyboard and touchscreen inputting. This is not limited in this embodiment of the present invention.

Figure 6:
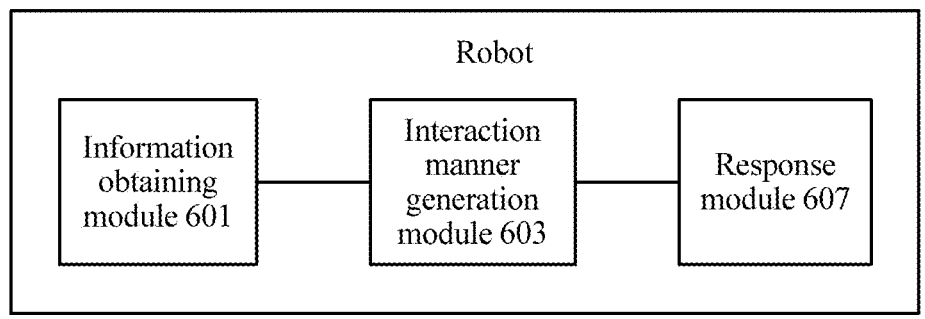
FIG. 6 is a structural diagram of a robot according to an embodiment of the present invention.

An embodiment of the present invention provides a robot device. As shown in FIG. 6, FIG. 6 provides a structural diagram of an embodiment of the present invention. The robot device includes: an information obtaining module 601, an interaction manner generation module 603, and a response module 607. The information obtaining module 601 is configured to: collect interaction information of a companion target, and obtain digital person information of a companion person. The interaction information includes interaction information of a sound or an action of the companion target toward the robot, and the digital person information includes a set of digitized information of the companion person. The interaction manner generation module 603 is configured to: determine, based on the interaction information and the digital person information, a manner of interacting with the companion target, and generate, based on the digital person information of the companion person and by using a machine learning algorithm, an interaction content corresponding to the interaction manner. Alternatively, scores of a plurality of interaction contents corresponding to the interaction manner may be generated by using the machine learning algorithm, and one or more contents may be selected from the scores of the plurality of interaction contents as the interaction content. The response module 607 is configured to generate a response action toward the companion target based on the interaction manner and the interaction content.

In an embodiment of the present invention, the information obtaining module 601 is further configured to obtain latest behavior information of the companion person in a time period prior to a current moment. The behavior information of the companion person is collected by a mobile device carried by the companion person. The interaction manner generation module 603 is configured to generate, based on the digital person information and the latest behavior information of the companion person and by using the machine learning algorithm, scores of a plurality of interaction contents corresponding to the interaction manner. Further, the interaction manner generation module 603 is further specifically configured to determine, by using the interaction information, the digital person information, and the latest behavior information, the manner of interacting with the companion target.

In an embodiment of the present invention, the information obtaining module 601 is further configured to: obtain latest behavior information of the companion person in a time period prior to a current moment, and obtain digital person update information of the companion person by analyzing the latest behavior information. The digital person update information is used to improve or update the digital person information, and the digital person information is determined by analyzing the behavior information of the companion person or in a manual input manner. Further, the digital person update information with an additional weight may be added to the digital person information, to improve or update the digital person information by using the update information. In a specific implementation, a value of the additional weight may be adjusted, to increase or decrease impact caused by the behavior information of the companion person in the time period prior to the current moment on the digital person information.

In an embodiment of the present invention, the information obtaining module 601 is further configured to add the digital person update information to the digital person information by using the machine learning algorithm.

In an embodiment of the present invention, the digital person information includes one or more of the following types of information: personal basic information, personal experience information, values information, educational idea information, and behavior habit information. The interaction manner generation module 603 is configured to: calculate semantic similarity between the digital person information, the interaction information, and the interaction manner, and select an interaction manner with maximum semantic similarity as the manner of interacting with the companion target. The interaction manner generation module 603 is further configured to generate, by using a model generated by training, scores of a plurality of interaction contents corresponding to the interaction manner. The model uses the digital person information as an input, and uses the scores of the plurality of interaction contents corresponding to the interaction manner as an output.

In an embodiment of the present invention, the companion person includes a plurality of companion persons, the digital person information of the companion person is a weighted summation of feature information of the plurality of companion persons, and a weight of the feature information of the companion person may be preset or may be obtained through manual inputting. In a more specific embodiment, the companion person includes a plurality of companion persons, and the digital person information of the companion person is obtained by using machine learning of feature information of the plurality of companion persons.

In each embodiment, an execution body of the device is executed by the robot accompanying the companion target, and the digital person information of the companion person is collected by the mobile device carried by the companion person. Modules of the robot shown in FIG. 6 may complete and execute procedure operations of method embodiments and have functions required by the method embodiments.

Figure 7:
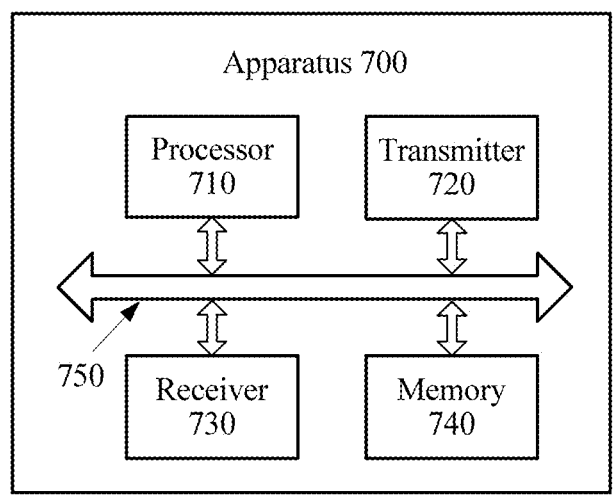
FIG. 7 is a structural diagram of a robot computer system according to an embodiment of the present invention.

FIG. 7 shows another robot device 700 according to an embodiment of the present invention. The robot 700 includes a processor 710, a transmitter 720, a receiver 730, a memory 740, and a bus system 750. The robot should also have an execution mechanical part. The execution mechanical part may be a mechanical apparatus, for example, a mechanical arm or a crawler/wheel type mobile mechanical apparatus. In addition, the robot further has components interacting with the outside world, such as a display, a microphone, and a camera that may be collectively referred to as execution components. The processor 710, the transmitter 720, the receiver 730, and the memory 740 are connected by the bus system 750. The memory 740 is configured to store an instruction. The processor 710 is configured to execute the instruction stored in the memory 740, so as to control the transmitter 720 to send a signal or control the receiver 730 to receive a signal. The transmitter 720 and the receiver 730 may be communications interfaces. Specifically, the transmitter 720 may be an interface configured to receive data or an instruction, and the receiver 730 may be an interface configured to send data or an instruction. A specific form of the transmitter 720 and the receiver 730 is not described by using an example herein. It should be understood that, in this embodiment of the present invention, the processor may be a central processing unit (CPU for short), or the processor may be another general-purpose processor, a digital signal processor (DSP for short), an application-specific integrated circuit ASIC, a field programmable gate array (FPGA for short) or another programmable logic device, a discrete gate or a transistor logic device, a discrete hardware component, or the like. The general-purpose processor may be a microprocessor, or the processor may be any conventional processor or the like. Devices of the robot shown in FIG. 7 may complete and execute procedure operations of each method embodiment by cooperating with each other under control of the processor and have functions required by the method embodiment.

The robot 700 may be configured to execute operations or processes corresponding to the data collection device in the foregoing method embodiment. Optionally, the memory 740 may include a read-only memory and a random access memory, and provide an instruction and data for the processor. A part of the memory may further include a nonvolatile random access memory. For example, the memory may further store information about a device type. The processor 710 may be configured to execute the instruction stored in the memory, and when the processor executes the instruction, the processor may perform operations corresponding to the data collection device in the foregoing method embodiment. In this embodiment of the present invention, the processor may be a central processing unit (CPU for short), or the processor may be another general-purpose processor, a digital signal processor (DSP for short), an application-specific integrated circuit ASIC, a field programmable gate array (FPGA for short) or another programmable logic device, a discrete gate or a transistor logic device, a discrete hardware component, or the like. The general-purpose processor may be a microprocessor, or the processor may be any conventional processor or the like. The processor can carry or implement the information obtaining module 601 and the interaction manner generation module 603, and control the response module 607. The response module 607 may be an action execution mechanical part of the robot.

In an implementation process, operations in the foregoing methods can be implemented by using a hardware integrated logical circuit in the processor, or by using instructions in a form of software. The operations of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the operations in the foregoing methods in combination with hardware of the processor. To avoid repetition, details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present invention. The foregoing storage medium includes: any medium that can store program code, such as a USB flash drive, a removable hard disk, a read-only memory (English: read-only memory, ROM for short), a random access memory (random access memory, RAM for short), a magnetic disk, or an optical disc.

What is claimed is:

1. A robot control method, comprising:
    collecting interaction information of a companion target and obtaining digital person information of a companion person, wherein the interaction information comprises information of a sound or an action of the companion target toward a robot, and the digital person information comprises a set of digitized information of the companion person;
    determining, based on the interaction information and the digital person information, a manner of interacting with the companion target;
    generating, based on the digital person information of the companion person using a machine learning algorithm, an interaction content corresponding to the interaction manner;
    generating a response action toward the companion target based on the interaction manner and the interaction content;
    obtaining behavior information of the companion person in a time period prior to a current moment; and
    obtaining digital person update information of the companion person by analyzing the behavior information, wherein the digital person update information is used to update the digital person information of the companion person.

2. The control method according to claim 1, wherein generating, based on the digital person information of the companion person using the machine learning algorithm, the interaction content corresponding to the interaction manner comprises:
    generating, based on the digital person information and the behavior information of the companion person using the machine learning algorithm, a plurality of available interaction contents corresponding to the interaction manner, and
    selecting one or more interaction contents from the plurality of available interaction contents.

3. The control method according to claim 1, wherein determining, based on the interaction information and the digital person information, the manner of interacting with the companion target further comprises: determining, based on the interaction information, the digital person information, and the behavior information, the manner of interacting with the companion target.

4. The control method according to claim 1, further comprising:
    before obtaining the digital person information of the companion person, adding the digital person update information with an additional weight to the digital person information to modify the digital person information based on the digital person update information.

5. The control method according to claim 4, further comprising: adjusting a value of the additional weight to increase or decrease an impact caused by the behavior information of the companion person in the time period prior to the current moment on the digital person information.

6. The control method according to claim 1, wherein the digital person information comprises one or more of the following types of information: personal basic information, personal experience information, values information, educational idea information, or behavior habit information; and
the determining, based on the interaction information and the digital person information, the manner of interacting with the companion target comprises:
calculating a semantic similarity between the digital person information and the interaction manner and a semantic similarity between the interaction information and the interaction manner, the semantic similarity determined using a word vector analysis, and
selecting an interaction manner with maximum similarity as the manner of interacting with the companion target.

7. The control method according to claim 1, further comprising:
generating, based on the digital person information of the companion person, scores of a plurality of interaction contents corresponding to the interaction manner, and
selecting the interaction content from the plurality of interaction contents based on the scores.

8. The control method according to claim 7, wherein the generating, based on the digital person information of the companion person, the scores of the plurality of interaction contents corresponding to the interaction manner comprises:
generating, using a model generated by training, the scores of the plurality of interaction contents corresponding to the interaction manner, wherein the model uses the digital person information as an input, and produces the scores of the plurality of interaction contents corresponding to the interaction manner as an output.

9. The control method according to claim 1, wherein the companion person comprises a plurality of companion persons, and the digital person information of the companion person is a weighted summation of feature information of the plurality of companion persons.

10. A robot device, comprising:
an information obtaining module configured to: collect interaction information of a companion target, and obtain digital person information of a companion person, wherein the interaction information comprises information of a sound or an action of the companion target, and the digital person information comprises a set of digitized information of the companion person;
an interaction manner generation module configured to: determine, based on the interaction information and the digital person information, a manner of interacting with the companion target, and generate, based on the digital person information of the companion person using a machine learning algorithm, an interaction content corresponding to the interaction manner; and
a response module configured to generate a response action toward the companion target based on the interaction manner and the interaction content,
wherein the information obtaining module is further configured to:
obtain behavior information of the companion person in a time period prior to a current moment, wherein the behavior information of the companion person is collected by a mobile device carried by the companion person; and
obtain digital person update information of the companion person by analyzing the behavior information, wherein the digital person update information is used to update the digital person information, and the digital person information is determined by analyzing the behavior information of the companion person or in a manual input manner.

11. The robot device according to claim 10, wherein:
the interaction manner generation module is further configured to:
determine, based on the interaction information and the digital person information, the manner of interacting with the companion target,
generate, based on the digital person information and the behavior information of the companion person using the machine learning algorithm, a plurality of available interaction contents corresponding to the interaction manner, and
select one or more interaction contents from the plurality of available interaction contents.

12. The robot device according to claim 10, wherein:
the interaction manner generation module is further configured to:
determine, based on the interaction information, the digital person information, and the behavior information, the manner of interacting with the companion target, and
generate, based on the digital person information of the companion person using the machine learning algorithm, the interaction content corresponding to the interaction manner.

13. The robot device according to claim 11, wherein:
the information obtaining module is further configured to add the digital person update information with an additional weight to the digital person information to modify the digital person information by using the digital person update information.

14. The robot device according to claim 13, wherein the information obtaining module is further configured to adjust a value of the additional weight to increase or decrease impact caused by the behavior information of the companion person in the time period prior to the current moment on the digital person information.

15. The robot device according to claim 10, wherein the digital person information comprises one or more of the following types of information: personal basic information, personal experience information, values information, educational idea information, or behavior habit information; and
the interaction manner generation module is further configured to:
calculate a semantic similarity between the digital person information, the interaction information, and the interaction manner, the semantic similarity determined using a word vector analysis, and
select an interaction manner with maximum semantic similarity as the manner of interacting with the companion target.

16. The robot device according to claim 10, wherein the interaction manner generation module is further configured to:
generate, based on the digital person information of the companion person, scores of a plurality of interaction contents corresponding to the interaction manner, and
select the interaction content from the plurality of interaction contents based on the scores using a model generated by training, wherein the model uses the digital person information as an input, and produces the scores of the plurality of interaction contents corresponding to the interaction manner as an output.

17. A non-transitory computer-readable medium having instructions stored therein, which when executed by a processor, cause the processor to perform operations, the operations comprising:

collecting interaction information of a companion target and obtaining digital person information of a companion person, wherein the interaction information comprises information of a sound or an action of the companion target toward a robot, and the digital person information comprises a set of digitized information of the companion person;

determining, based on the interaction information and the digital person information, a manner of interacting with the companion target;

generating, based on the digital person information of the companion person using a machine learning algorithm, an interaction content corresponding to the interaction manner;

generating a response action toward the companion target based on the interaction manner and the interaction content;

obtaining behavior information of the companion person in a time period prior to a current moment; and obtaining digital person update information of the companion person by analyzing the behavior information, wherein the digital person update information is used to update the digital person information of the companion person.

18. The computer-readable medium according to claim 17, wherein generating, based on the digital person information of the companion person using the machine learning algorithm, the interaction content corresponding to the interaction manner comprises:

generating, based on the digital person information and the behavior information of the companion person using the machine learning algorithm, a plurality of available interaction contents corresponding to the interaction manner, and selecting the interaction content from the plurality of available interaction contents.

19. The computer-readable medium according to claim 17, wherein the operations further comprise:

before obtaining the digital person information of the companion person, adding the digital person update information with an additional weight to the digital person information to modify the digital person information based on the digital person update information; and adjusting a value of the additional weight to increase or decrease an impact caused by the behavior information of the companion person in the time period prior to the current moment on the digital person information.

20. The computer-readable medium according to claim 17, wherein the companion person comprises a plurality of companion persons, and the digital person information of the companion person is a weighted summation of feature information of the plurality of companion persons.

* * * * *

UNITED STATES PATENT AND TRADEMARK OFFICE
CERTIFICATE OF CORRECTION

PATENT NO. : 11,511,436 B2
APPLICATION NO. : 16/276576
DATED : November 29, 2022
INVENTOR(S) : Sixiao Yang et al.

It is certified that error appears in the above-identified patent and that said Letters Patent is hereby corrected as shown below:

In the Claims

In Claim 13, Column 26, Line 26, delete "according to claim 11," and insert --according to claim 10,--.

Signed and Sealed this
Fourteenth Day of February, 2023

Katherine Kelly Vidal
*Director of the United States Patent and Trademark Office*